UNITED STATES PATENT OFFICE.

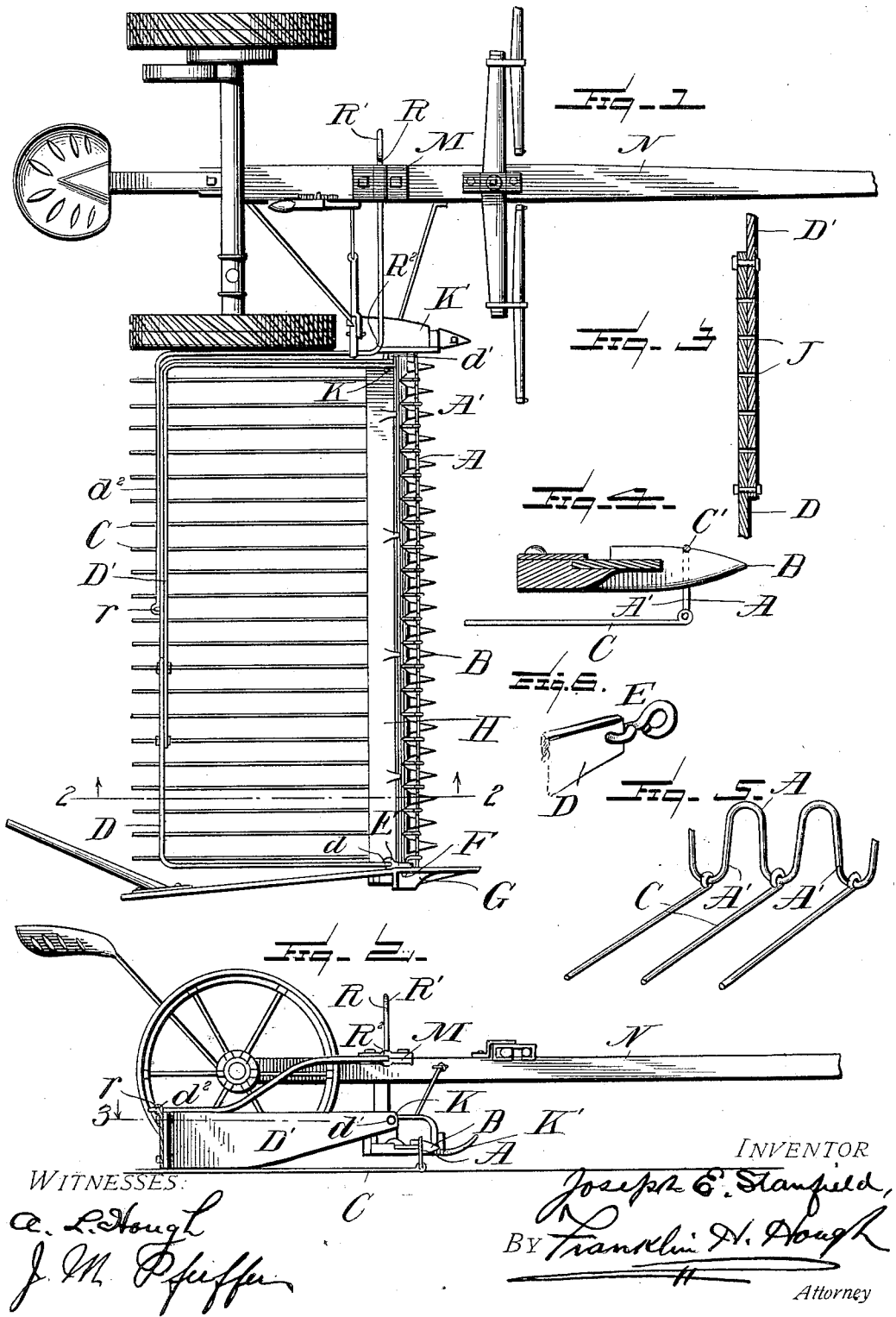

JOSEPH ERNEST STANFIELD, OF GARY, NEBRASKA.

MOWER ATTACHMENT.

SPECIFICATION forming part of Letters Patent No. 649,619, dated May 15, 1900.

Application filed February 14, 1900. Serial No. 5,174. (No model.)

*To all whom it may concern:*

Be it known that I, JOSEPH ERNEST STANFIELD, a citizen of the United States, residing at Gary, in the county of Banner and State of Nebraska, have invented certain new and useful Improvements in Mower Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in mower attachments, and especially to an apparatus which may be readily applied to a mower for the purpose of accumulating the grain as it is cut and dumping the same by means of a foot-actuated lever.

To these ends and to such others as the invention may pertain the same consists in the novel construction, combination, and adaptation of parts, all as more fully hereinafter described, shown in the drawings, and then specifically claimed.

The invention is clearly illustrated in the accompanying drawings, forming a part of this specification, in which—

Figure 1 is a top plan view of a mower with my attachment applied thereto. Fig. 2 is a section upon the line 2 2 of Fig. 1. Fig. 3 is a section upon the line 3 of Fig. 2. Fig. 4 is an enlarged sectional detail taken through the cutter-bar. Fig. 5 is an enlarged detail in perspective of a portion of the curved rod with trailer-arms attached thereto. Fig. 6 is a detail view showing the pivotal connection of one end of the dumping attachment.

Reference now being had to the details of the drawings by letter, A designates a rod having a series of loops A', and B designates the finger-guards of the mower, over which guards the loops A' are caught in applying the attachment. Pivoted to the alternate loops between the guards are the trailing rods C, having eyes at their pivoted ends, and these rods are designed to trail upon the ground and underneath the bar supporting the finger-guards, there being a notch left in each of said finger-guards, as at C', in order to allow for ample room, so that the looped rod and its attachments will not interfere with the cutting apparatus.

The adjustable dumping members comprise the two pieces D and D', which are bent as shown, and one of said pieces, as D, has an aperture $d$ at one end in which a double-eye pivotal pin E is carried, the other eye of said pin being pivoted to the bolt F, carried by the casting G at the outer end of the guard-bar H. The tapering end of the member D' has an aperture $d'$, whereby said end may be pivoted to a bolt K on the foot K'. The meeting ends of said members are designed to have a series of registering apertures J J, and by means of bolts the overlapping ends may be adjusted in different sets of registering apertures accordingly as it may be desired to adapt the dumping attachment to mowers having different lengths of cutter-bars. The under edges of the members D and D' when adjusted for use rest upon the free ends or near the free ends of the trailing rods.

Mounted on the frame of the mower, preferably at a location near the fixed end of the tongue N, is a casting M, in which casting is journaled the foot-lever rod R, bent, as at R', to form the foot-actuated part, and said rod after passing through the casting is bent, as at $R^2$, at right angles to its journaled portion and extends rearward to a location opposite the swinging end of the dumping device, and then said rod is bent at right angles and the eye $r$ at the end of the rod is caught into an aperture $d^2$ in the upper edge of the member D'. By the provision of this foot-actuated lever it will be noted that the dumping device may be easily operated by simply depressing the foot-engaging end of the lever.

The operation of my improved attachment will be readily understood. The grain as it is cut falls on the trailing rods and accumulates thereon, being held there by the members D and D' until a sufficient quantity of the grain has accumulated to dump. As the foot-lever is depressed the dumping device is raised and the grain is allowed to fall off the trailers.

Owing to the simplicity of my invention it may be easily attached to a mower, thus making the mower capable of being utilized as a machine for bunching the grain and depositing same at intervals where it may be conveniently loaded.

Having thus described my invention, what I claim to be new, and desire to secure by Letters Patent, is—

An attachment for mowers, comprising, in combination with the finger-board, and finger-guards thereon, the looped rod engaging over said guards, the trailing rods having eyes engaging the alternate loops of said rod, and a dumping device pivoted to the mower, and means for operating the dumping device, as set forth.

In testimony whereof I affix my signature in presence of two witnesses.

JOSEPH ERNEST STANFIELD.

Witnesses:
ALONZO THURMAN,
W. R. HAMPTON.